Oct. 15, 1929.    J. F. WINDSOR    1,731,366
STRAINER AND METHOD OF MAKING THE SAME
Filed May 13, 1927
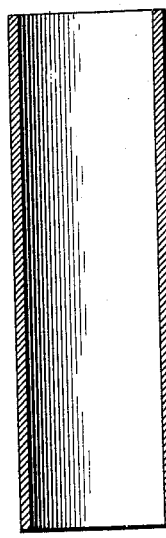
Fig. 1.
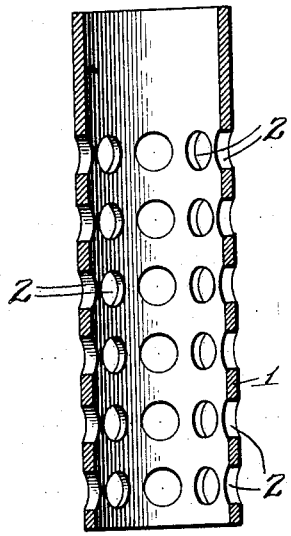
Fig. 2.
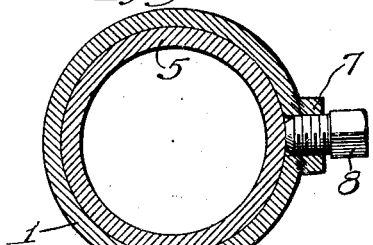
Fig. 5.
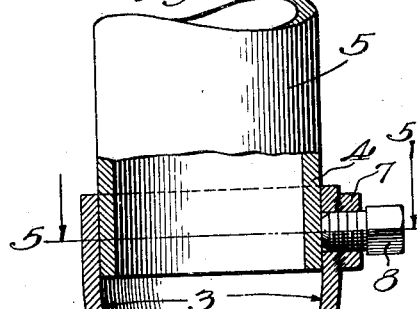
Fig. 4.
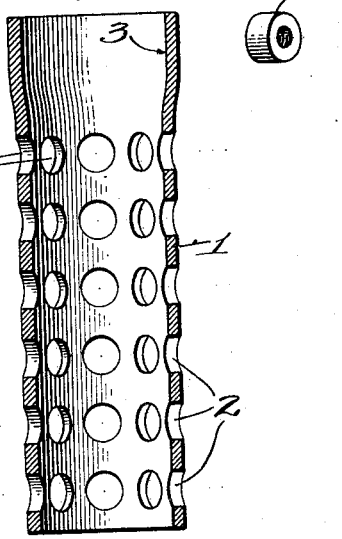
Fig. 3.
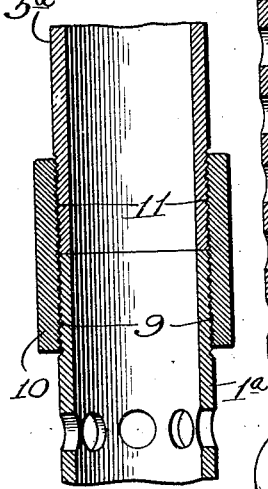
Fig. 6.
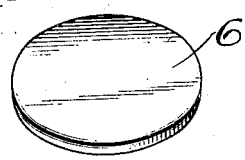
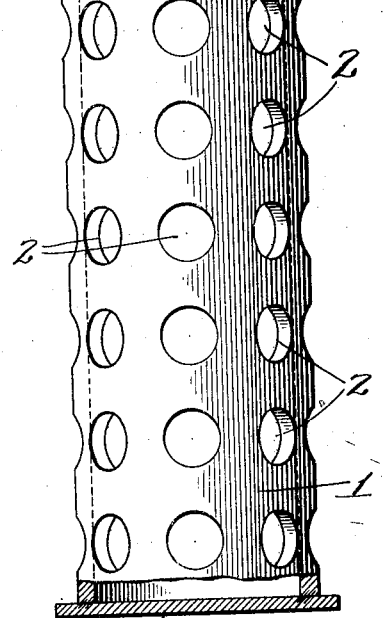
Inventor:
J. F. Windsor
By: Wallace R. Lane
Atty.

Patented Oct. 15, 1929

1,731,366

UNITED STATES PATENT OFFICE

JOHN F. WINDSOR, OF CHICAGO, ILLINOIS, ASSIGNOR TO CLAYTON MARK & COMPANY, OF CHICAGO, ILLINOIS, A CORPORATION OF ILLINOIS

STRAINER AND METHOD OF MAKING THE SAME

Application filed May 13, 1927. Serial No. 191,007.

The present invention relates to strainers and the method of making the same.

Among the objects of the invention is to provide a novel strainer and a novel method of making a strainer of metal tubing, such as steel tubing, with the advantages of being light in weight, strong and durable, as well as not being subjected to breaking, cracking or the like, as also a more economical way of manufacturing and producing the device.

In the specific illustrative embodiment and process of making the strainer, the latter may be produced by the cutting of a given length of metal tubing, then punching holes in it, then welding, as by electric spot welding or otherwise, a closure piece at one end of the tubing and then providing means at its other end for connection to a duct conductor, conduit or the like, such as screw threading the same for coupling or by enlarging or expanding the other end of the tubing so as to form or provide a socket or the like for the reception of an end of a conductor or suction pipe or duct. Also, for the purpose of securing the conductor to the strainer, the expanded end of the tubing may have welded to it a boss or similar piece of metal, which with the adjacent tubing part may be bored, tapped and threaded to receive a securing element, such as a set screw adapted to bind or secure the end of the conductor in the expanded socket portion of the tubing.

Other objects, advantages, capabilities, features and process steps are comprehended by the invention as will later appear and are inherently possessed thereby.

Referring now to the drawings, Fig. 1 is a longitudinal sectional view of a tubing part from which the strainer is to be formed.

Fig. 2 is a similar view showing punched apertures or holes in the tubing blank.

Fig. 3 is a similar view showing an end of the blank being enlarged or expanded by the socket for the reception of a conductor, together with a perspective showing of an end member to be welded to the other end of the tubing and a boss or similar metal piece to be welded to the side of the expanded portion of the tubing.

Fig. 4 is a view partly in vertical elevation and partly in broken section of a completed strainer and connected conductor part.

Fig. 5 is a transverse sectional view taken in a plane represented by line 5—5 in Fig. 4 of the drawings.

And, Fig. 6 is a fragmentary sectional view of an alternate form of device and connecting means.

Referring now more in detail to the drawings, the embodiment selected to illustrate the invention is shown as made from a cut piece of tubing 1 which is preferably of cylindrical and hollow form. The side walls of the tubing are then provided with a plurality of apertures 2 which may be effected by the punching of the metal of the side walls of the tubing blank, these apertures being arranged and of a size so as to increase the effective straining space over that now appearing in strainers of different construction.

After the tubing blanks has been punched with apertures the blank may then be placed in a suitable machine to expand, enlarge or spin an end portion so as to provide a socket portion 3 adapted to receive an end 4 of a conductor 5, which may act as the suction pipe to a pump. To the other end of the tubing may be connected a closure piece 6 which may be in the form of a disk and which may be secured to the end of the tubing by means of welding or the like, and as shown in Fig. 4 of the drawings.

For the purpose of securing the end portion 4 of the conductor in the socket so as to maintain the same together, a metal boss or nut 7 may be welded to the side of the expanded portion 3, as shown in Figs. 4 and 5 of the drawings. The adjacent portion of the expanded part may then be bored, tapped and threaded, if desired, so that the nut 7 and the adjacent portion of the tubing may receive a securing element or set screw 8, the inner end of which is adapted to bind with the end portion 4 of the conductor 5 so as to secure the same in place in the expanded end of the strainer.

In lieu of the above form of connection, a coupling connection may be used as shown in Fig. 6 whereby the strainer body 1ª has a threaded end portion 9 to which is connected a pipe coupling 10 or the like. To the latter may be connected the threaded end 11 of a duct or conduit 5ª.

While I have herein described and upon the drawings shown an illustrative embodiment of the invention as well as described a mode of producing the same, it is to be understood that the invention is not limited thereto but may comprehend other constructions, arrangements of parts, details, features and process steps without departing from the spirit thereof.

Having thus disclosed the invention, I claim:

1. A strainer comprising a single piece body of metal tubing and having apertures, an end piece rigidly connected to said body, there being means rigidly connected at the other end of said tubing for connection to a conductor.

2. A strainer comprising a single piece body of metal tubing and having apertures, a cap piece rigidly secured to an end of the tubing by welding, there being means rigidly connected to the other end of the tubing for connection to a conductor.

3. A strainer comprising a single piece body of metal tubing and having apertures, a cap piece rigidly secured to an end of the tubing, said other end of the tubing being expanded to provide a socket for the connection of a conductor.

4. A strainer comprising a single piece body of metal tubing and having apertures, a cap piece rigdly secured to an end of the tubing, said other end of the tubing being expanded to provide a socket for the connection of a conductor, and means carried by the expanded end of the tubing for securing said conductor in said socket.

5. The process of making strainers, comprising perforating a piece of metal tubing, expanding an end thereof, and securing a cap piece at the other end thereof.

6. The process of making strainers, comprising cutting a piece of metal tubing to given length, providing apertures therein, enlarging an end portion of the cut piece of tubing, and securing an end piece to the other end of the piece of tubing.

7. The process of making strainers, comprising providing a piece of metal tubing of given length with a plurality of holes, securing an end piece to an end of the tubing to form a closure for the same, and shaping the other end of the tubing to provide a connecting means for a conductor.

8. The process of making strainers, comprising punching holes in a metal tubing of given length, fixing a closure member at one end of the tubing, and shaping the other end of the tubing for the connecting of a conductor.

9. The process of making strainers, comprising punching holes in a metal tubing of given length, welding an end piece to an end of the tubing to form a closure for the same, and shaping the other end of the tubing for the connecting of a conductor.

10. The process of making strainers, comprising punching holes in a metal tubing of given length, fixing a closure member at one end of the tubing, and expanding the other end of the tubing to form means for connecting a conductor.

11. The process of making strainers, comprising punching holes in a metal tubing of given length, welding an end piece of metal tubing of given length with a plurality of holes, shaping the other end of the tubing for the connecting of a conductor, welding a boss to said latter end of the tubing, and machining said boss and adjacent tubing for the reception of a securing element to secure the conductor in place.

12. A strainer comprising a single piece body of metal tubing and having apertures, a cap piece rigidly secured to an end of the tubing, the other end of the tubing having a different diameter than that of the body to provide means for connecting to a conductor.

13. A strainer comprising a single piece body of metal tubing and having apertures, said body having a given diameter and having an end portion of different diameter and adapted for connection to a conductor, and a closure member rigidly secured to the other end of said body.

14. The process of making strainers, comprising perforating a piece of metal tubing of given diameter, operating upon an end portion of said piece of tubing to effect a different diameter to form means adapted for connection to a conductor, and securing a cap piece to the other end of said piece of tubing.

15. The process of making strainers, comprising cutting a piece of metal tubing of given diameter to a given length, changing the diameter of an end portion of the cut piece of tubing to provide means for connecting to a conductor, and connecting an end piece to the other end of the piece of tubing.

In witness whereof, I hereunto subscribe my name to this specification.

JOHN F. WINDSOR.